UNITED STATES PATENT OFFICE.

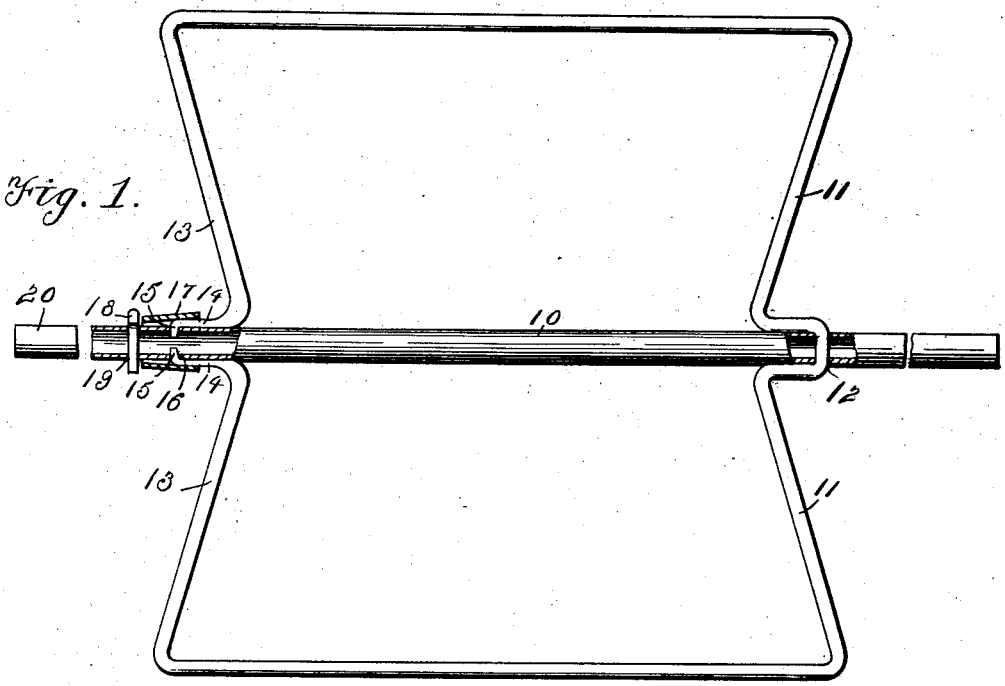
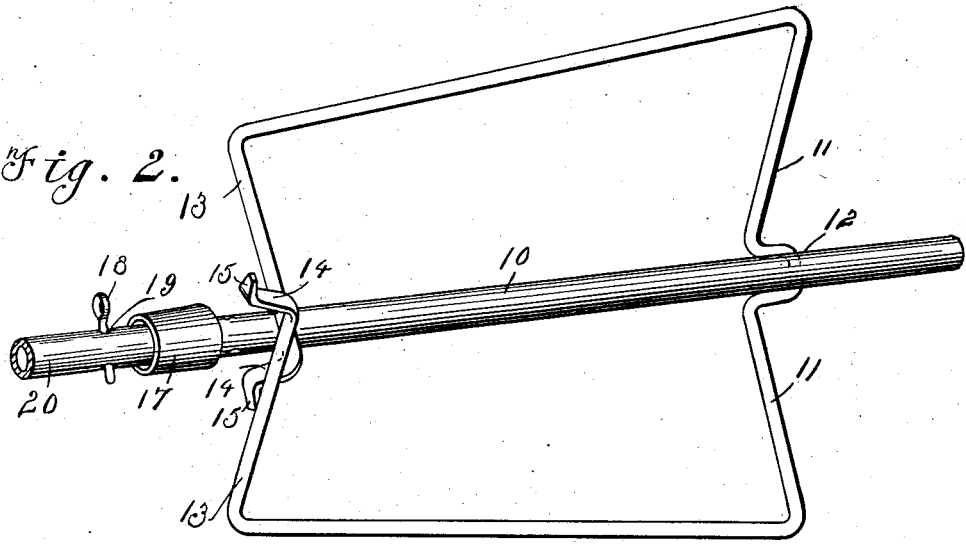

ANDREW J. ISHAM, OF SEVIERVILLE, TENNESSEE.

REEL.

1,021,606.  Specification of Letters Patent.  Patented Mar. 26, 1912.

Application filed September 9, 1911. Serial No. 648,489.

*To all whom it may concern:*

Be it known that I, ANDREW J. ISHAM, a citizen of the United States, residing at Sevierville, in the county of Sevier and State of Tennessee, have invented new and useful Improvements in Reels, of which the following is a specification.

An object of the invention is to provide a device for reeling wire or the like.

For the purpose mentioned use is made of a shaft, a reel bar for rigid engagement with the shaft, the mentioned reel bar being preferably constructed of a flexible material.

Reference is to be had to the accompanying drawings constituting a part of this specification, in which similar characters of reference denote corresponding parts in all the views, and in which—

Figure 1 is a front elevation of my device, parts being broken away to disclose the underlying structure. Fig. 2 is a perspective view of my device showing the ends of the reel bar disengaged from the shaft and pressed inwardly for the purpose of mounting a coil of wire thereon.

Referring more particularly to the views, I provide a shaft 10 having a reel bar 11 mounted to swing thereon at the point 12, the mentioned reel bar being extended in opposite directions over both sides of the shaft and preferably constructed of a flexible material, the ends 13 of the reel bar being bent to form flanges 14 provided with integral laterally extending retaining lugs 15 adapted to repose in apertures 16 in the shaft 10, a collar 17 being slidably mounted on the shaft to encircle the flanges 14 and retain the lugs 15 within the apertures 16, the mentioned collar being retained in rigid engagement with the flanges 14 by a suitable cotter pin 18 passed through apertures 19 in the shaft 10. The reel bar 11 at the point 12, is preferably constructed similarly to a crank with the crank portion thereof mounted to extend through the shaft 10, thus permitting the reel bar 11 to swing relatively to the shaft as will be readily understood. Now assuming that the shaft 10 is mounted on a suitable carriage to permit of rotating the shaft, when it is desired to mount a coil of wire on the reel bar for the purpose of unreeling the same, the pin 18 is first removed from the shaft, the collar 17 is slid out of engagement with the flanges 14 and then by pulling outwardly on the ends 13 of the bar, the lugs 15 will be removed from the apertures 16 thus permitting the reel bar to swing on the shaft 10. Now by passing a coil of wire over the end 20 of the shaft 10 and pressing inwardly on the ends 13 of the reel bar, the mentioned coil of wire can be conveniently slipped over the reel bar, after which the ends 13 are pressed apart so that the lugs 15 can be repositioned in the apertures 16, it being understood that when the ends 13 are pressed apart, the coil of wire will be rigidly retained on the reel bar. The collar 17 is now moved to engage the flanges 14 to retain the lugs 15 in the apertures 16 and by inserting the pin 18 in one of the apertures 19, the collar 17 will be locked relatively to the flanges 14. The shaft 10 being rotatably mounted on a suitable carriage can now be revolved, thus revolving the reel bar 11 to unreel the wire, it being understood that the wire will be reeled up on the reel bar when the revolving motion of the shaft is reversed.

The device described embodies a structure consisting of comparatively few parts, simple in their construction and arrangement and although I have described my device as used in connection with wire for reeling or unreeling the same, it will be understood that various kinds of ropes or coils can also be wound or unwound on my reel.

Having thus fully described the invention, what I claim as new, is:—

1. In a reel the combination of a shaft, a flexible reel bar mounted on the shaft, the said reel bar being provided with a cranked offset at one end adapted to extend through the shaft to permit the reel bar to swing thereon and means at the other end for releasably retaining the ends of the reel bar in rigid engagement with the shaft.

2. In a reel, the combination of a shaft, a flexible reel bar mounted on the shaft, the said reel bar being provided with a cranked offset at one end adapted to extend through the shaft to permit the reel bar to swing thereon and a collar at the other end for rigidly retaining the ends of the reel bar in engagement with the shaft.

3. In a reel, the combination of a shaft, a flexible reel bar mounted on the shaft, the said reel bar being provided with a cranked offset at one end adapted to extend through the shaft to permit the reel bar to swing thereon, a collar mounted to encircle the shaft and slidable thereon for retaining the opposite ends of the reel bar in rigid engagement with the shaft and a pin adapted to extend through the said shaft and lock the said collar with the ends of the reel bar.

In testimony whereof I affix my signature in presence of two witnesses.

ANDREW J. ISHAM.

Witnesses:
A. W. MIZE,
J. N. G. FOX.

Copies of this patent may be obtained for five cents each, by addressing the "Commissioner of Patents, Washington, D. C."